United States Patent
Sheffield et al.

(10) Patent No.: US 7,035,701 B2
(45) Date of Patent: Apr. 25, 2006

(54) HAND MICROPHONE INTERFACED TO GAME CONTROLLER PORT OF PERSONAL COMPUTER

(75) Inventors: John Sheffield, Folsom, CA (US); Frederic Schneider, Oxford, CT (US); Betsy L. Hipp, Orange, CT (US)

(73) Assignee: Dictaphone Corporation, Stratford, CT (US)

( * ) Notice: Subject to any disclaimer, the term of this patent is extended or adjusted under 35 U.S.C. 154(b) by 151 days.

(21) Appl. No.: 10/305,022

(22) Filed: Nov. 27, 2002

(65) Prior Publication Data

US 2003/0091205 A1  May 15, 2003

Related U.S. Application Data

(62) Division of application No. 09/334,399, filed on Jun. 16, 1999, now Pat. No. 6,529,450.

(60) Provisional application No. 60/095,055, filed on Aug. 3, 1998.

(51) Int. Cl.
    *G06F 17/00* (2006.01)
(52) U.S. Cl. ............... 700/94; 369/25.01; 369/29.01; 369/29.02

(58) Field of Classification Search .............. 720/94; 369/25.01, 29.01, 29.02; 704/201, 270; 710/8, 710/1, 62; 379/75
See application file for complete search history.

(56) References Cited

U.S. PATENT DOCUMENTS

| 4,121,060 A | * | 10/1978 | Bohnhoff | 369/29.01 |
|---|---|---|---|---|
| 5,402,518 A | | 3/1995 | Lowery | |
| 5,548,566 A | | 8/1996 | Barker | |
| 5,777,904 A | * | 7/1998 | Schneider | 708/141 |
| 5,818,800 A | | 10/1998 | Barker | |
| 6,184,862 B1 | | 2/2001 | Leiper | |

* cited by examiner

*Primary Examiner*—Brian T. Pendleton
(74) *Attorney, Agent, or Firm*—Kelley Drye & Warren LLP

(57) ABSTRACT

A hand microphone and an adaptor module form an assembly which is a peripheral device for a personal computer. The hand microphone is used to control dictation functions to be carried out by the PC. Two separate analog control signal channels are output from the hand microphone and applied, respectively, as X- and Y-axis inputs for the game port on the PC. Control signals carried in the two signal channels are generated by actuating control switches mounted on the hand microphone.

4 Claims, 4 Drawing Sheets

FIG. 5 HAND MIC. SCHEMATIC

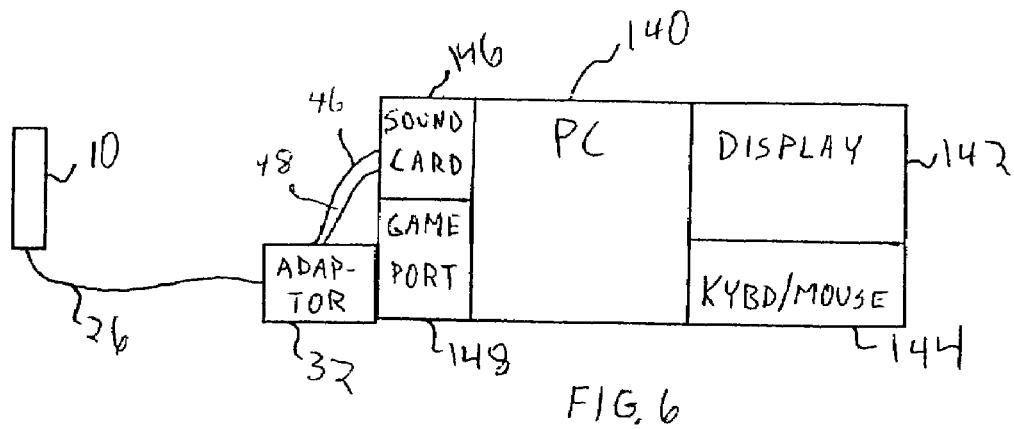
FIG. 6
FIG. 7
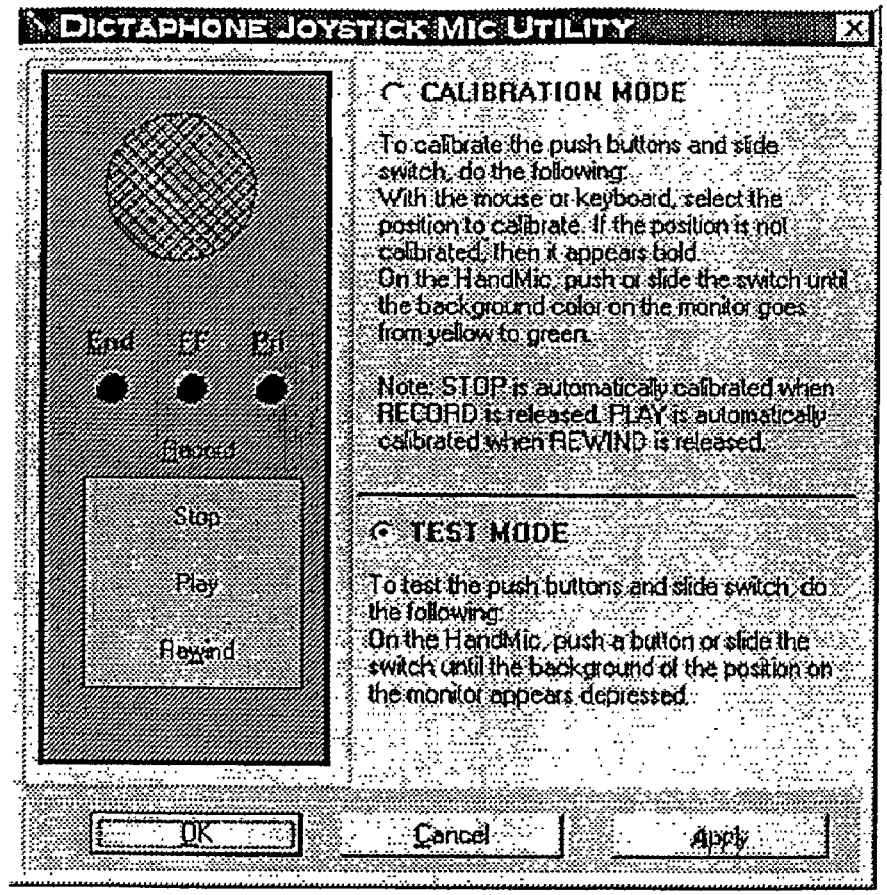

HAND MICROPHONE INTERFACED TO GAME CONTROLLER PORT OF PERSONAL COMPUTER

CROSS-REFERENCE TO RELATED APPLICATION

This is a continuation-in-part of U.S. application Ser. No. 09/334,399, filed Jun. 16, 1999, now U.S. Pat. No. 6,529,450, which claims the benefit of provisional patent application Ser. No. 60/095,055 filed Aug. 3, 1998.

FIELD OF THE INVENTION

This invention is concerned with dictation systems, and more particularly with a hand microphone which includes switches for controlling dictation functions and is adapted to be connected as an input device to a personal computer used as a sound recording device in a dictation system.

BACKGROUND OF THE INVENTION

It has been proposed to implement central dictation systems or dictation systems for small work groups by utilizing a number of personal computers that are connected to each other by a data communication network such as a local area network (LAN). Such dictation systems use the well known capabilities now included in most personal computers for recording voice information inputted into the personal computer by a microphone which is connected to the personal computer. Typically, such microphones are connected to a "sound card" which is a standard component of many types of personal computer. (The term "personal computer" should be understood to include all of the computing devices, whether portable or desktop, which operate with the Windows or Macintosh or other well-known operating systems, and are used for office applications such as word-processing or financial spreadsheets.)

A dictation system implemented with networked personal computers is described in co-pending patent application Ser. No. 09/099,501, which has common inventors and a common assignee with the present application. Computer software, hand microphones and foot-pedals used to adapt a personal computer network to operate as a dictation system are commercially available from the assignee of the present application under the trademark "Boomerang".

A hand microphone suitable for connection to a personal computer as part of the Boomerang system is described in the above-referenced '501 patent application. The hand microphone disclosed therein resembles in its physical appearance hand microphones which are conventionally interfaced to desktop dictation tape recorders. The hand microphone includes a voice input microphone, a speaker, and a number of manually-actuatable function control switches. All of these components are installed in or on a compact housing which is shaped and sized to be held conveniently in the user's hand. Also installed within the housing is a microprocessor which receives and interprets control signals generated by the control switches and transmits suitable control signals to the personal computer via a data communication channel.

Although the hand microphone disclosed in the '501 patent application operates very satisfactorily for its intended purpose, it would be desirable to reduce the cost of the hand microphone while preserving most or all of its functions.

It has also been proposed to provide a hand microphone that is interfaced to a personal computer for the purpose of controlling dictation operations, wherein the hand microphone provides an analog signal level to a game port or other suitable receptacle of the personal computer. However, known hand microphones which provide an analog signal level are limited in the number of different control functions that the microphone supports, and also may fail to generate control signals with sufficient precision to prevent malfunctions.

OBJECTS AND SUMMARY OF THE INVENTION

It is accordingly an object of the invention to provide a hand microphone suitable for connection to a personal computer to control dictation functions carried out by the personal computer.

It is a further object to provide such a hand microphone which can be produced at low cost while providing a substantial number of different control functions.

It is still a further object of the invention to provide a dictation system in which such a hand microphone is used.

According to the invention, there is provided a microphone assembly for inputting voice signals and dictation control signals into a personal computer. The microphone assembly provided in accordance with the invention includes a hand microphone which generates an analog audio signal as well as first and second control signal levels. The assembly also includes first, second and third connection paths, of which the first transmits the analog audio signal generated by the microphone to the sound card of the personal computer, the second connection path transmits the first control signal level as an X-axis input signal to the personal computer game port, and the third signal path transmits the second control signal level as a Y-axis input signal to the personal computer game port. The hand microphone includes a conventional electrical or electronic microphone to generate the analog audio signals, a plurality of first switches and associated circuitry for selectively generating the first control signal level and a plurality of second switches and associated circuitry for selectively generating the second control signal levels. A portion of all of the connection paths is constituted by an adaptor module which is mounted to the computer game port by a multi-pin connector. One of the pins is inserted into an X-axis input receptacle on the game port and constitutes a portion of the second connection path, another one of the pins is inserted into Y-axis receptacle on the game port and constitutes a part of the third connection path. A separate cord extends from the module into the line-in or audio-in port of the personal computer and constitutes part of the first connection path. In addition, a multi-conductor cord interconnects the hand microphone and the adaptor module and constitutes a portion of each one of the first, second and third connection paths. A fourth connection path is provided for transmitting audio output from the sound card of the personal computer to a speaker incorporated in the hand microphone, and is constituted by an additional cord between the computer's line-out port and the adaptor, as well as the adaptor itself and the above-mentioned cord which interconnects the hand microphone and the adaptor module.

By providing a manually-operable hand microphone which outputs two analog control signal levels, respectively controlled by respective groups of manually-actuatable switches on the hand microphone, the present invention permits a considerable number of dictation and related functions to be controlled through the hand microphone with a high degree of reliability and ease of use. In addition, since no machine "intelligence" is required to be incorporated in the hand microphone itself, the cost of manufacturing the hand microphone is low.

Other objects, features and advantages of the invention will become apparent from the subsequent more detailed description of preferred embodiments.

BRIEF DESCRIPTION OF THE DRAWINGS

FIG. 6 is a schematic block diagram of the hand microphone and adaptor module of the present invention interfaced to a personal computer.

FIG. 7 is an example of a screen display which the personal computer of FIG. 6 is programmed to provide in accordance with the present invention.

DESCRIPTION OF PREFERRED EMBODIMENTS

A preferred embodiment of the invention will now be described, initially with reference to FIG. 1.

Figure 1:
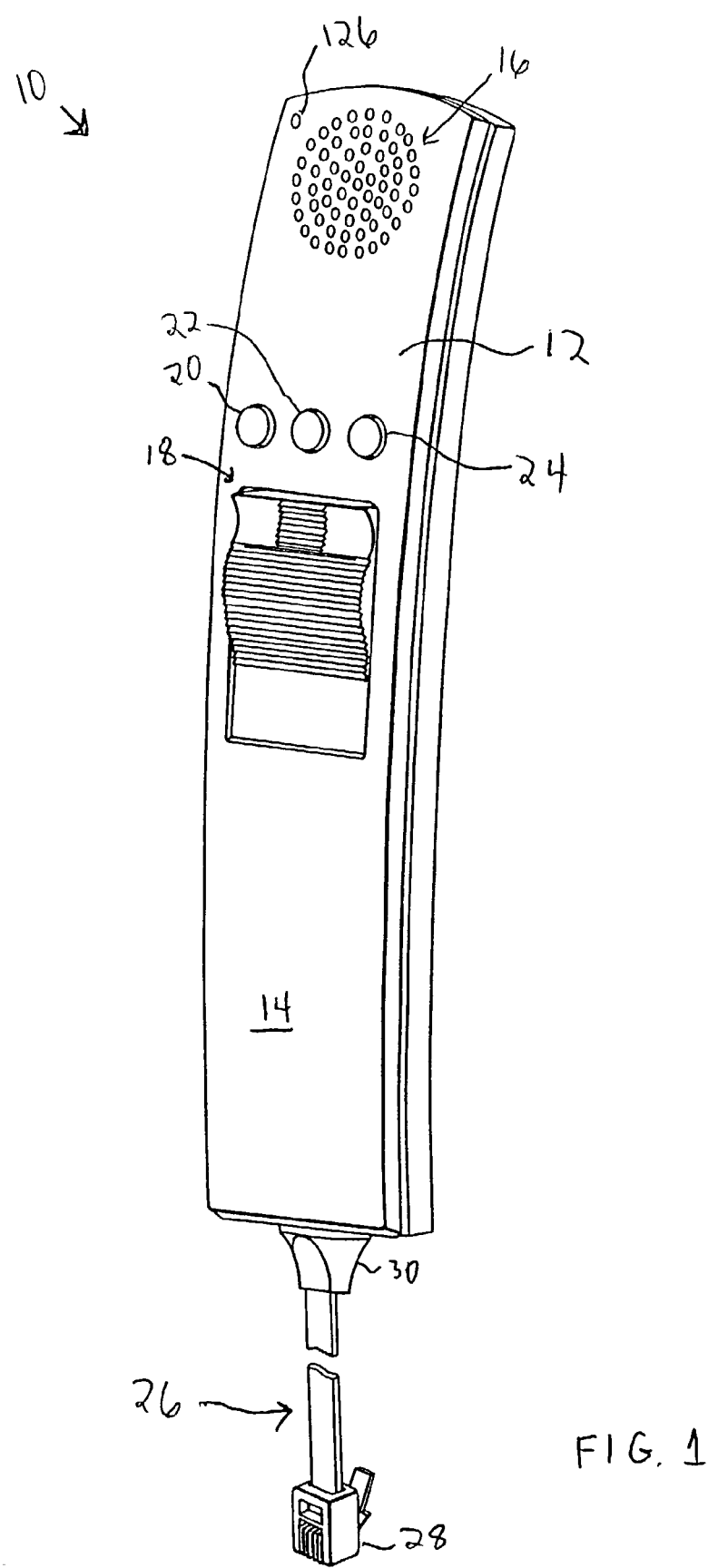
FIG. 1 is a perspective view of a hand microphone provided in accordance with the invention and showing a front or control surface of the hand microphone.

In FIG. 1 reference numeral 10 generally indicates a hand microphone which is provided in accordance with the invention. The microphone 10 includes a "skin" or housing 12. As will be apparent to those of ordinary skill in the art, hand microphone 10 is similar or identical in appearance to conventional hand microphones used as input and control devices in connection with desktop dictation recorders or central dictation recorders.

The housing 12 has a front or control surface 14 which includes a grille region 16. Behind the grille region 16 there are provided a microphone and a speaker, which are not shown in FIG. 1. A multi-position slide switch 18 is installed at a central portion of the front surface 14 of the hand microphone 10. The slide switch 18 is preferably like those featured as part of the user interface in high-quality dictation equipment. Each of the positions of the slide switch 18 corresponds to a respective dictation control function such as "record", "stop", "play" and "rewind".

Above the slide switch 18 is a row of push button switches 20, 22 and 24.

Depending on the nature of software which may be installed in a personal computer to which the microphone 10 is interfaced, the push button switches 20, 22 and 24 may be programmable in the sense that the respective functions controlled by the switches may be changed by inputting suitable selection data or program information into the personal computer. Alternatively, the computer may be programmed so that the control functions actuated by the push button switches 20, 22 and 24 are invariate.

The respective functions actuated by the buttons 20, 22, 24 may be, for example, "end" (for indicating that dictation of the present voice file is complete); "fast forward"; and "priority" (for designating that the present voice file is to be transcribed before other files not so designated).

Connected to the bottom of the housing 12 of the hand microphone 10 is a signal connection cord 26. The cord 26 is of a type which contains multiple conductors, and in a preferred embodiment, is a 15-foot coil cord of a flat telephone type, unshielded, and having six separate conductors. The cord 26 terminates in a standard RJ-14 plug, indicated by reference numeral 28. At the end connected to the hand microphone 10, the cord 26 is fitted into a rubber stopper 30 which aids in securing the cord 26 to the housing 12 of the hand microphone.

Figure 2:
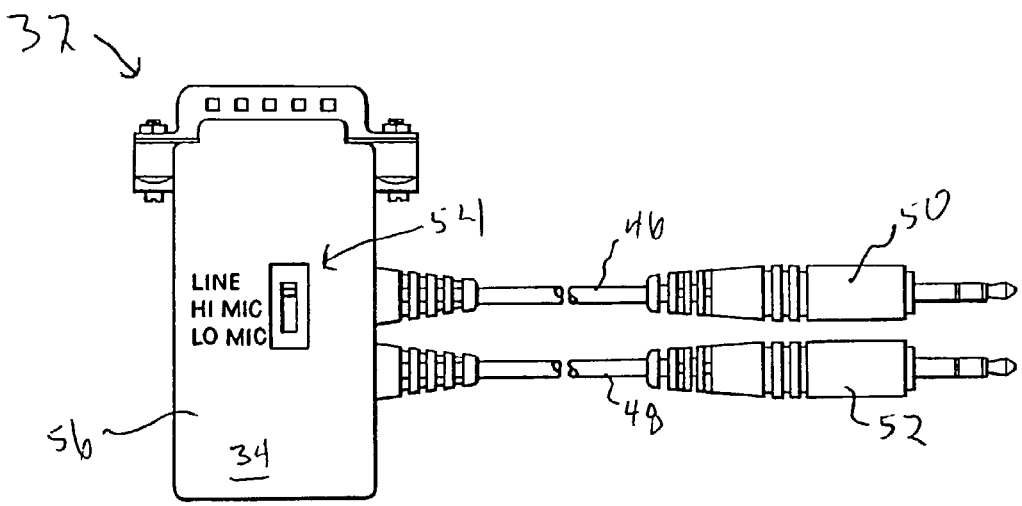
FIG. 2 is a top plan view of an adaptor module which also forms a part of the present invention.
Figure 3:
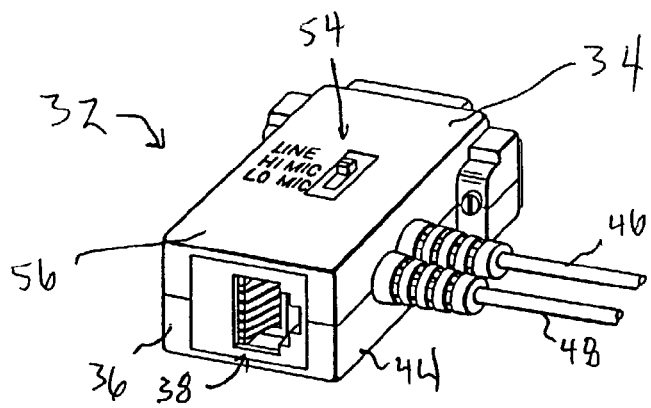
FIG. 3 is a perspective view showing the front side of the adaptor module of FIG. 2.
Figure 4:
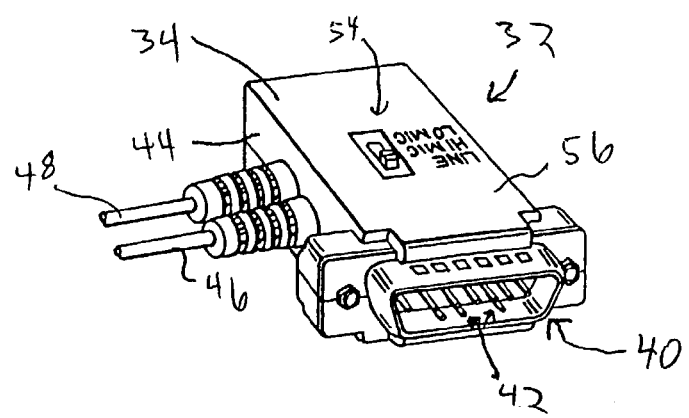
FIG. 4 is a perspective view showing the rear side of the adaptor module of FIGS. 2 and 3.

FIG. 2 is a plan view of an adaptor module 32 which provides a mechanical and electrical interface between the hand microphone 10 and a personal computer to which the hand microphone is to be connected. The adaptor module 32 is also seen in FIGS. 3 and 4 in front and rear perspective views, respectively.

The adaptor module 32 is substantially in the form of a rectangular prism, which is defined by a plastic housing 34. On a front face 36 of the housing 34 a standard RJ-14 jack (reference numeral 38, FIG. 3) is provided to receive the plug 28 of the connection cord 26. At the opposite (rear) side of the adaptor module 32 is a DB-15 male connector (reference numeral 40, FIG. 4). The connector 40 includes a plurality of pins 42 which extend outwardly from the adaptor module 32. As will be recognized by those who are skilled in the art, the connector 40 is suitable for direct connection to the game port of a personal computer. One of the pins 42 is positioned to be inserted into an X-axis input of the game port and another one of the pins is positioned to be inserted into the Y-axis input of the game port. Additional ones of the pins 42 are used as power and ground connections. As will be understood from subsequent discussion, power for the hand microphone is received from the personal computer via the game port and the connector 40.

Emerging from a side wall 44 of the module housing 34 are two connector cords 46, 48, which are terminated in respective plugs 50, 52. The cords 46, 48 are preferably 21 inches long and of a standard type typically used in audio applications, such as connecting together stereo components. One of the plugs 50 is to be inserted into the "line-in" (microphone input) port for the sound card of the personal computer and the other is to be plugged into the "line-out" (speaker output) port of the sound card. Preferably the plugs 50 and 52 are color-coded (e.g., one red and the other black) to aid in matching the plugs 50, 52 with the appropriate audio port of the computer.

A three position slide switch 54 is mounted on the top surface 56 of the module housing 34. The slide switch 54 is provided to permit the audio output from the hand microphone 10 to be matched to the appropriate level for the particular sound card of the personal computer to which the hand microphone is to be connected.

Internal electrical and electronic components of the hand microphone 10 and contained in the housing 12 will now be described with reference to FIG. 5.

The six conductors of the signal connection cord 26 (FIG. 1) are terminated at a Berg connector 60 (FIG. 5) after being wound around a ferrite bead (not shown) to suppress RF interference. One of the conductors of the signal connection cord carries an analog audio signal which originates at a conventional microphone 62. The signal from microphone 62 is filtered at components labeled 64 and 66, and amplified at amplifier stages 68 and 70. Filtered power for the amplifier stage 68 is provided via a power filter element 71. In a preferred embodiment of the invention, the amplifier stage 68 provides a gain factor of 20 and the amplifier stage 70 provides a gain factor of 6. The amplified audio signal outputted from amplifier stage 70 is coupled to the respective conductor of the connection cord 26 for transmission to the personal computer via the adaptor module 32.

An analog audio signal which is output from the sound card of the personal computer is transmitted to the hand microphone via another connector of the cord 26 and is applied to drive a speaker 72 after being filtered and amplified at filter 74 and amplifier stage 76, respectively. In a preferred embodiment the amplifier stage 76 provides a gain factor of 12.

Two more of the six conductors of the connection cord 26 are used for power and ground connections, respectively. A 5-volt power signal sourced from the game port of the personal computer and transmitted through the connection cord 26 is filtered at filter stages 76, 78 and then boosted to an unregulated 13.25 volts by charge pump 80. The boosted power level is filtered at filter stage 82 and then is regulated down to a 12-volt power supply level at regulator 84. The resulting 12-volt power is used to derive two analog control signals which are outputted from the hand microphone to the game port of the personal computer. One of the control signals, which is applied through a conductor of the connection cord 26 and the adaptor module 32 to the Y-axis input of the game port, is generated by a combination of a constant current source 86 and a switch/resistor network made up of switches 88, 90, 92 and 94 and resistors 96, 98, 100 and 102.

Figure 5:
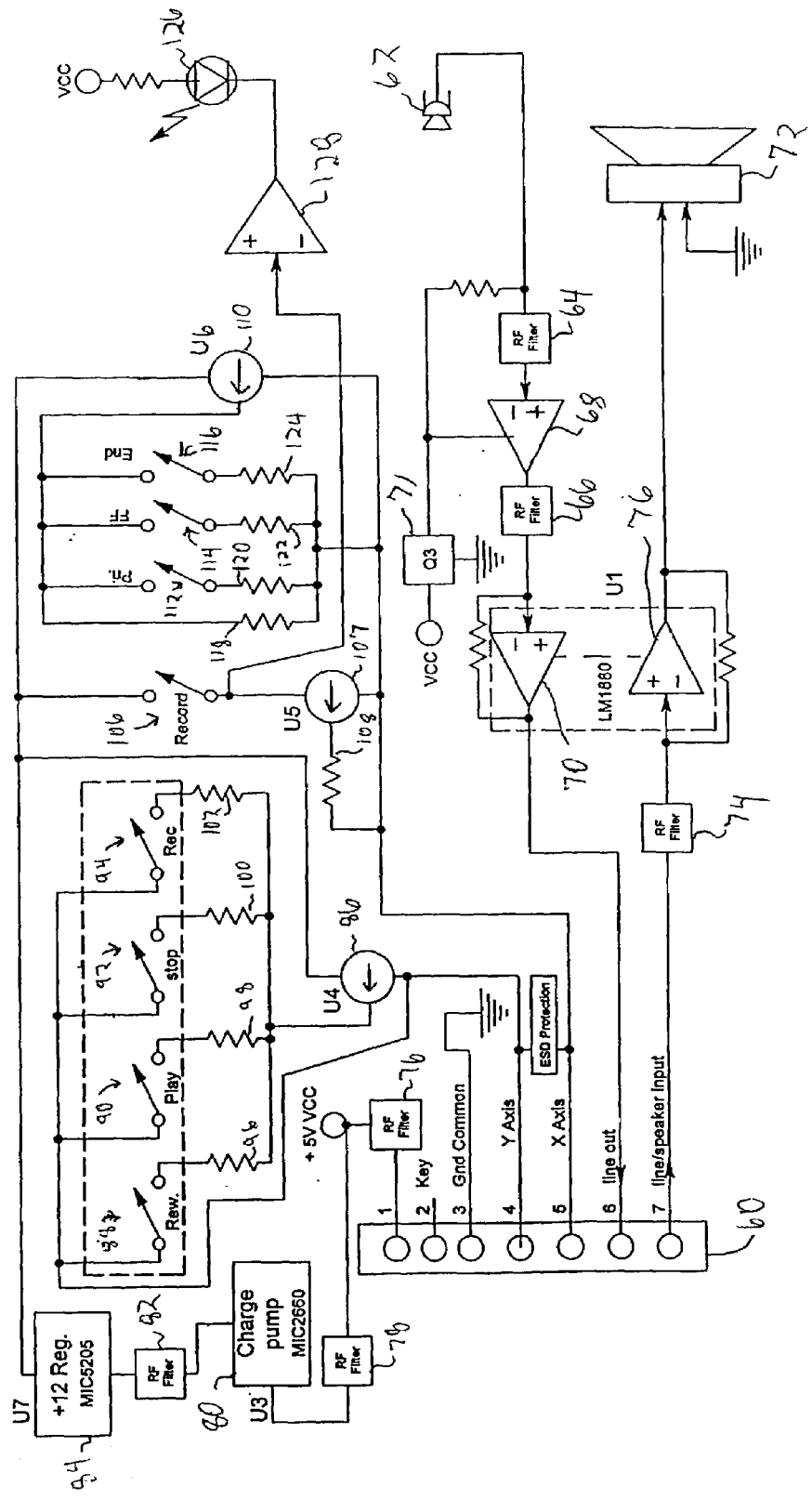
FIG. 5 is a simplified schematic diagram of electrical and electronic components of the hand microphone of FIG. 1.

The switches 88, 90, 92 and 94 shown in FIG. 5 correspond to respective positions of the slide switch 18 shown in FIG. 1 and when closed respectively actuate the "rewind", "play", "stop" and "record" functions. When switch 88 is closed, the current from constant current source 86 is allowed to flow through resistor 96; when switch 90 is closed, the current from current source 86 is allowed to flow through resistor 98; when switch 92 is closed, current from the current source 86 is allowed to flow through resistor 100; and when switch 94 is closed, current from the current source 86 is allowed to flow through resistor 102. The respective values of the resistors 96–102 are selected so as to generate easily distinguishable voltage levels. In a preferred embodiment of the invention, the resistor values are selected as follows:

| | |
|---|---|
| Resistor 96: | 681 ohms |
| Resistor 98: | 897 ohms |
| Resistor 100: | 1,100 ohms |
| Resistor 102: | 1,580 ohms |

When the slide switch 18 is in its record position, this also causes closure of a switch 106 in FIG. 5. When switch 106 is closed, a current provided by constant current source 107 is allowed to flow through resistor 108 to provide one of the signal levels that is ultimately provided, via a last one of the conductors of connection cord 26, as an X-axis input to the game port of the personal computer. In a preferred embodiment the resistor 108 has a value of 357 ohms.

The other levels for the X-axis input signal are generated by a constant current source 110 and a switch/resistor network made up of switches 112, 114, 116 and resistors 118, 120, 122 and 124. The switches 112, 114 and 116 correspond to respective ones of the push button switches 20, 22 and 24 shown in FIG. 1. When switch 112 is closed, current from the constant current source 110 is allowed to flow through resistor 120; when switch 114 is closed, current from the current source 110 is allowed to flow through resistor 122; and when switch 116 is closed, current from the current source 110 is allowed to flow through resistor 124. The resistor 118 is always connected to current source 110 and provides an idle level for the X-axis control signal. Again, the resistor values are selected to provide easily distinguishable control signal levels which correspond to the various control functions, and in a preferred embodiment of the invention the resistor values are as follows:

| | |
|---|---|
| Resistor 118: | 1,910 ohms |
| Resistor 120: | 887 ohms |
| Resistor 122: | 2,100 ohms |
| Resistor 124: | 3,240 ohms |

The switch 106, which is closed to actuate the "record" function, also controls an LED 126 via a Darlington switch 128. The LED 126 (also shown in FIG. 1) performs the conventional function of providing a visual indication when the record function is being carried out.

FIG. 6 is a simplified block diagram which shows the hand microphone 10 of the present invention interfaced to a personal computer 140 so that the hand microphone 10 can be used to control the PC 140 to perform dictation functions. It is to be understood from previous discussion that the PC 140 may be connected to other PC's (not shown) via a network facility (not shown). The PC 140 includes conventional elements such as a display 142, a keyboard and mouse (collectively indicated by reference numeral 144), a sound card 146 and a game port 148, and working and mass data storage elements (which are not separately shown).

The adaptor 32 is mounted to the game port 148 (via the connector 40 shown in FIG. 4) and, together with the cords 26, 46 and 48, provides a number of signal paths between the hand microphone 10 and the PC 140. In particular, a first signal path is provided by one of the conductors in cord 126, the adaptor 32 and one of the cords 46 or 48 as an input analog audio signal path to the sound card 146. A second signal path provides an analog signal level via cord 26 and adaptor 32 as an X-axis input to the game port 148. A third signal path, also provided through the cord 26 and the adaptor 32, provides an analog control signal level as a Y-axis input to the game port. A fourth signal path is provided for transmitting an analog audio signal outputted from the sound card to the hand microphone 10 via one of the connection cords 46, 48, the adaptor 32 and the cord 26. Additionally, ground and power signal paths are provided through the adaptor 32 and the cord 26 so that the hand microphone 10 is powered from the game port 148.

The game port 148 reads the above-mentioned control signal levels applied to the X- and Y-axis inputs of the game port 148 according to a conventional technique. The PC 140 is programmed to enter into a dictation mode of operation upon receipt of a suitable signal via the keyboard or mouse, and when in the dictation mode interprets the control signal levels in a manner to implement conventional dictation functions such as record, play, fast forward, rewind and so forth. It will be understood that when the "record" function is invoked, the voice signals generated at the microphone 10 are processed by the sound card 146 and stored by the PC 140 in the form of digital data according to known practices. When the "play" function is actuated through the hand microphone 10, the PC 140 reads previously recorded sound data and reproduces the sound data through the sound card 146 as an analog audio output signal that is audibly played back through the speaker component of the hand microphone 10.

It is well within the abilities of those having ordinary skill in the art to create the software required to program the PC 140 to perform the functions referred to in the preceding paragraph.

According to a preferred embodiment of the invention, the PC 140 is also programmed so as to be selectively operable in a "calibration mode", in which the PC 140 collects data which enables the PC to accurately detect the correspondence between the varying X-input and Y-input signals and the dictation control functions which those signal levels are intended to invoke. When the PC 140 is placed in the calibration mode, the display 142 of the PC is caused to provide a screen display like that shown in FIG. 7. It is believed that the information conveyed by FIG. 7 is self-explanatory, and it is well within the abilities of those who are skilled in the art to program the PC 140 to provide the screen display of FIG. 7 and the calibration function represented by that screen display.

The hand microphone assembly provided according to this invention makes use of the signal detection capabilities of a standard PC game port to duplicate the sophisticated dictation control capabilities of more expensive hand microphone equipment. By providing two separate analog control signal channels, the hand microphone supports a rather large number of distinct control functions represented by signals that can be detected with a high degree of reliability and accuracy. Also, the provision of two separate control signal channels makes it possible to invoke simultaneously two different control functions.

The embodiment of the invention as described above includes one connection cord 26 to join the hand microphone 10 to the adaptor module 32. However, it is within the contemplation of the invention to provide one or more additional connection cords in series, preferably joined to each other by the standard RJ-14 plug and jack arrangements referred to above. It is also contemplated that a plastic rest for the hand microphone may be interposed as part of the signal path between the hand microphone 10 and the adaptor module 32. Provision of a suitable rest for the microphone with a suitable combination of plugs and/or jacks is also well within the abilities of those who are skilled in the art.

In the circuit arrangement illustrated in FIG. 5, the control signal levels are generated by using constant current sources coupled to resistor networks. This approach was chosen to enhance the precision of the generated signal levels, but other approaches are contemplated by the invention, including use of voltage dividers and/or potentiometers.

It is to be understood that the above description may indicate to those skilled in the art additional ways in which the principles of this invention may be used without departing from the spirit of the invention. For example, the number and types of dictation control functions to be invoked by the hand microphone may be changed. Also, the distribution of the control functions between the X-axis input channel and the Y-axis input channel is subject to change without departing from the invention. The particularly preferred embodiments of the apparatus are thus intended in an illustrative and not limiting sense. The true spirit and scope of the invention are set forth in the following claims.

What is claimed is:

1. A peripheral device for use with a personal computer, comprising:
    an adaptor module for being mounted on a game port of the personal computer, said adaptor module including a first pin for transmitting a signal to an X-axis input of the game port and a second pin for transmitting a signal to a Y-axis input of the game port;
    a connection cord for connecting said adaptor module to an audio input port of the personal computer;
    a hand microphone; and
    signal path means for providing signal paths between said hand microphone and said adaptor module;
    wherein said hand microphone includes:
    means for generating an analog audio signal transmitted to said connection cord via said signal path means and said adaptor module;
    first control means for generating a first analog control signal level transmitted to said first pin of said adaptor module via said signal path means; and
    second control means for generating a second analog control signal level transmitted to said second pin of said adaptor module via said signal path means.

2. A peripheral device according to claim 1, wherein said first control means of said hand microphone includes a first plurality of manually-actuatable switches and said second control means of said hand microphone includes a second plurality of manually-actuatable switches.

3. A peripheral device according to claim 1, wherein said signal path means includes a second connection cord which has plural conductors for electrically connecting said hand microphone to said adaptor module.

4. A peripheral device according to claim 3, wherein said band microphone also includes a speaker, and the peripheral device further comprises a third connection cord for connecting said adaptor module to an audio output port of the personal computer for receiving an audio signal to be audibly reproduced by said speaker.

* * * * *